May 31, 1960 T. R. QUERMANN Re. 24,829

BUOYED RATE GYROSCOPE

Original Filed July 8, 1957 2 Sheets-Sheet 1

INVENTOR
THOMAS R. QUERMANN
BY Henry L. Shanier
ATTORNEY

BUOYED RATE GYROSCOPE

Original Filed July 8, 1957 2 Sheets-Sheet 2

INVENTOR
THOMAS R. QUERMANN
BY
Henry L. Shenier
ATTORNEY

United States Patent Office

Re. 24,829
Reissued May 31, 1960

24,829

BUOYED RATE GYROSCOPE

Thomas R. Quermann, Long Island, N.Y., assignor, by mesne assignments, to United Aircraft Corporation, Hartford, Conn., a corporation of Delaware Original No. 2,865,206, dated Dec. 23, 1958, Ser. No. 670,436, July 8, 1957. Application for reissue Oct. 9, 1959, Ser. No. 845,582

8 Claims. (Cl. 74—5.5)

Matter enclosed in heavy brackets [ ] appears in the original patent but forms no part of this reissue specification; matter printed in italics indicates the additions made by reissue.

My invention relates to a buoyed rate gyroscope and more particularly to an improved buoyed rate gyroscope in which the damping force on the gyroscope gimbal housing is maintained substantially constant.

Buoyed rate gyroscopes are employed in the prior art in control servo mechanisms, stabilization systems and the like. In these gyroscopes the gyroscope motor is supported in a sealed gimbal housing which is buoyed by a liquid contained in an outer casing while being constrained to move about an axis disposed at right angles to the gyroscope spin axis. This manner of supporting the gyroscope gimbal assembly achieves two desirable results. First, it reduces the gimbal bearing friction to a point at which substantially the only function performed by the gimbal bearings is to define the axis of rotation of the gimbal housing. As a result, bearing friction has little effect on the accuracy of the gyroscope. The liquid which buoys the gimbal housing exerts a damping force on the housing to achieve a good frequency response and to prevent oscillations of the housing. While this manner of buoyantly supporting the gyroscope gimbal housing accomplishes these desirable results, it introduces an additional problem. Rate gyroscopes employed in systems such as missile guiding assemblies are subjected to a wide range of temperatures. These temperature variations change the viscosity of the buoying liquid to cause its damping effect to vary. It is desirable that some means be provided for maintaining the liquid damping force substantially uniform. The copending application of Clare E. Barkalow, Serial No. 650,588, filed April 4, 1957, for a buoyed gyroscope discloses one means for maintaining the liquid damping force substantially constant. The rate gyroscope disclosed in the copending application is provided with a volumetric thermostat which controls a heater in response to changes in volume of the liquid temperature, and hence the liquid viscosity, substantially constant. While the arrangement disclosed in the copending application operates satisfactorily, it requires an additional, power-consuming electrical heating element. It will be appreciated that this electrical element is not as reliable as an equivalent mechanical element, if such were provided. Further, while this system maintains the liquid temperature substantially constant, it operates only to heat the liquid and includes no means for cooling the liquid. Thus it is inherent in the operation of the system described in the copending application that it maintain the liquid temperature above the highest temperature to which the assembly is subjected.

My invention relates to an improved buoyed gyroscope having means for maintaining the damping force exerted on the gimbal housing substantially constant. My means for maintaining the damping force substantially constant is a simple mechanical arrangement requiring no extra electrical parts. In my gyroscope it is not necessary that the liquid temperature be maintained above the highest circumambient temperature to which the assembly is subjected.

One object of my invention is to provide an improved buoyed rate gyroscope having means for maintaining the gimbal housing damping force substantially constant.

Another object of my invention is to provide an improved rate gyroscope having a simple mechanical means for maintaining the gimbal housing damping force substantially constant.

A further object of my invention is to provide an improved rate gyroscope which requires no additional electrical element for maintaining the gimbal housing damping force substantially constant.

Other and further objects of my invention will appear from the following description.

In general my invention contemplates the provision of a gyroscope having a motor supported in a sealed housing which is buoyed by a liquid contained in an outer casing while being constrained to rotate about an axis at right angles to the gyroscope motor spin axis. An axially shiftable, cylindrical cage or sleeve disposed between the housing and the casing and restrained against rotation relative to the casing defines a film of liquid which provides a damping force for the housing. The cage has a wall formed by a number of resiliently supported sections adapted to be actuated effectively to decrease the cage diameter. A bellows responsive to an increase in liquid volume shifts the cage longitudinally of the outer casing to cause interengageable means carried by the casing and by the cage walls to move the walls radially inwardly toward the housing to decrease the thickness of the liquid film providing the damping force. In this manner the decrease in viscosity of the liquid resulting from an increase in temperature is compensated for to maintain the liquid damping force substantially uniform.

In the accompanying drawings which form part of the instant specification and which are to be read in conjunction therewith and in which like reference numerals are used to indicate like parts in the various views.

Figure 1:
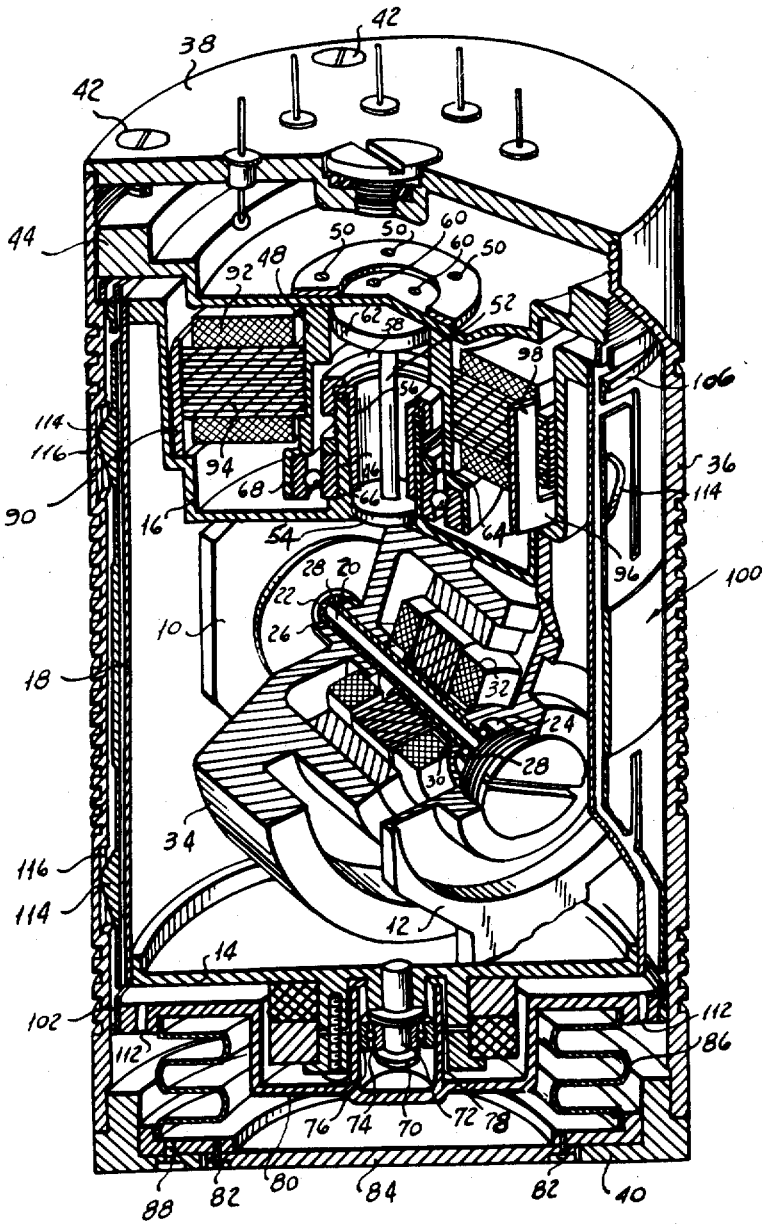
Figure 1 is a perspective view of my improved floated rate gyroscope with parts broken away and with parts shown in section.
Figure 3:
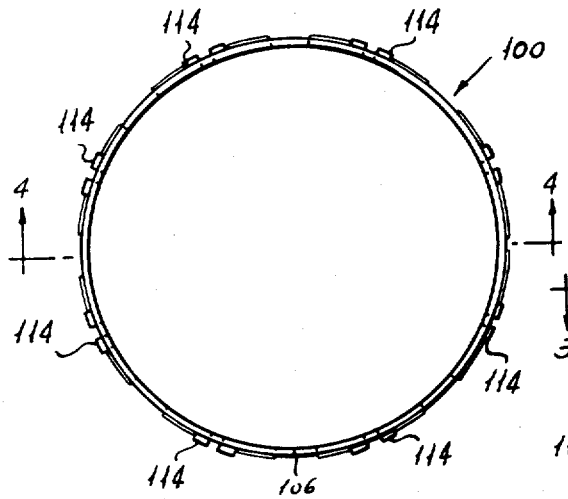
Figure 3 is a top plan view of the damping film cage of my improved buoyed rate gyroscope taken along the line 3—3 of Figure 2 and drawn on an enlarged scale.
Figure 2:
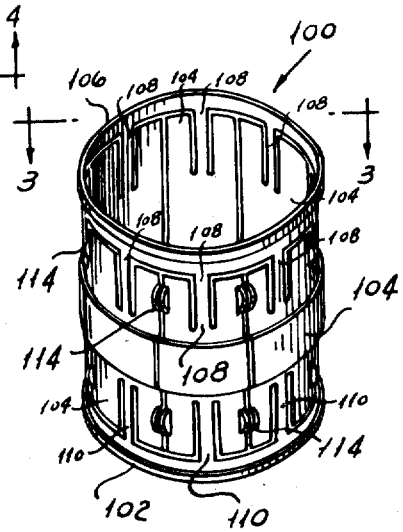
Figure 2 is a perspective view of the damping film defining cage of my improved buoyed rate gyroscope.
Figure 4:
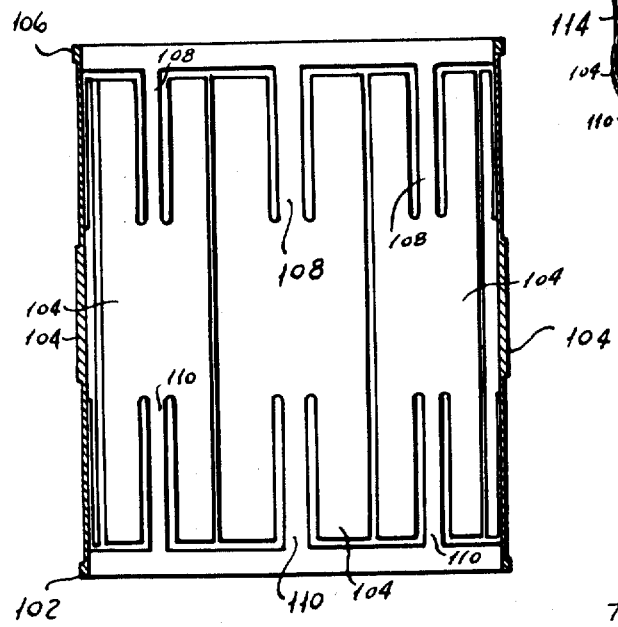
Figure 4 is a sectional view of the damping film cage of my improved buoyed rate gyroscope taken along the line 4—4 of Figure 3.

More particularly referring now to Figure 1 of the drawings, my improved rate gyroscope includes a pair of supports 10 and 12 carried by and extending between the base 14 and the cover plate 16 of the gyroscope gimbal housing 18. A bolt 20 carried by the supports retains respective outer bearing races 22 and 24 in the respective supports 10 and 12. A hollow shaft 26 having tapered ends forming inner bearing races is rotatably supported by balls 28 disposed between the shaft ends and races 22 and 24. A cylindrical, inwardly extending boss 30 formed on the support 12 carries the stator windings 32 of the gyroscope motor. I mount a gyroscope rotor 34 on the hollow shaft 26 for rotation with the shaft. As is known in the art, when the stator windings 32 are energized, rotor 34 rotates about a spin axis defined by the longitudinal axis of shaft 26. I fill the sealed housing 18 with a mixture of helium and nitrogen in a proportion of about 90 percent helium to about 10 percent nitrogen to a pressure of approximately 25 centimeters of mercury.

My improved gyroscope has an outer casing 36 provided with a top 38 and a base plate 40 secured to the casing 36 by any convenient means such as screws, welding or the like. A plurality of screws or the like 42 secure a support plate 44 to the underside of plate 38 within housing 36. A tubular boss 46 formed on the upper surface of cover plate 16 of housing 18 is adapted to telescope within a sleeve 48 secured to the underside of support plate 44 by any convenient means such as screws 50. A torsion bar 52 has a lower head 54 retained within boss 42 by a sleeve 56 held in the boss by a cap 58 screwed onto boss 46. In this manner the lower head 54 is clamped to and constrained to turn with the cover plate 16 and hence the housing 18. A plurality of screws 60 secure the upper head 62 of bar 54 to the support plate 44. Torsion bar 52 forms a spring against which the precessional force of the gyroscope during a turn acts. The displacement of the gyroscope housing against the action of the torsion bar 52 permits me to measure rate. It will be understood that when the rate becomes zero, the torsion bar 52 restores the gyroscope to its initial position in which its spin axis lies in a plane extending perpendicularly to the axis of the bar 52. In order to keep hysteresis loss to a minimum I form the bar 52 from a material such as beryllium copper contributing negligible hyteresis loss.

A ring 64 holds the inner race 66 of a bearing on the boss 46. I secure the outer race 68 of this bearing to sleeve 48 by any convenient means. This bearing, including races 66 and 68, forms one of the gimbal bearing supports. A nut 70 secures the inner race 74 of a bearing to a stub shaft 72 carried by the base 14 of housing 18. The outer race 76 of the bearing, including inner race 74, is disposed in a hollow cylindrical guide 78 formed on a plate 80. The bearing, including races 74 and 76, forms the other gimbal bearing support for housing 18. It will be seen that the bearing, including races 74 and 76, permits plate 80 to shift upwardly or downwardly with respect to housing 18 in a manner which will not interfere with the action of the bearing in permitting rotation of the housing 18.

A plurality of screws 82 retain a plate 84 over one end of a bellows 86 to seal this end of the bellows. Screws 88 fix bellows 86 to the base 40 of casing 36. I secure the end of the bellows remote from plate 84 to the underside of plate 80 by any convenient means such as welding or the like.

My gyroscope includes a pick-off device, indicated generally by the reference character 90, having a winding 92 carried by a stack of laminations 94 supported on sleeve 48 by any convenient means. Winding 92 forms both the input and output windings of the pick-off device. I secure a magnetic member 96 formed with a plurality of teeth 98 to plate 16 by any convenient means to form the rotor of the pick-off device 90. This pick-off device is described in detail in the copending application referred to hereinabove.

I fill the casing 36 with a liquid such, for example, as a silicone or a "Fluorolube" which latter is the registered trademark of the Hooker Electrochemical Company for a trifluorovinyl chloride buoyantly to support the housing 18 within the casing 36. As has been explained hereinabove, this fluid buoys the housing 18 with a force such that substantially the only function performed by the housing bearings is to define the axis of rotation of the housing. As has also been explained hereinabove, this fluid provides a damping force for housing 18 to give the gyroscope a good frequency response and to prevent oscillations of the housing 18. If the gyroscope is to give accurate results it is necessary that the damping force of the liquid be made as nearly uniform as possible.

Referring now to Figures 1 to 4, my floated rate gyroscope includes a cage, indicated generally by the reference character 100, having a lower support ring 102 secured to plate 80 by any convenient means such as welding or the like. Cage 100 is formed with a plurality of wall sections 104 resiliently supported between ring 102 and an upper ring 106 by respective pairs of resilient supports, each pair of which includes a support 108 connecting a section 104 to ring 106 and a support 110 connecting the section to ring 102. These supports 108 and 110 normally position the sections 104 so that the sections, together with rings 102 and 106, form a cylinder. From the structure thus far described it will be seen that the wall sections 104 of cage 100 confine a film of liquid between the inner surfaces of the wall sections and the outer surface of housing 18. I so construct my gyroscope that with the wall sections 104 in the positions to which they are urged by supports 108 and 110 a film of liquid of a predetermined thickness is confined between the wall sections and housing 18. This film provides a predetermined damping force at a selected temperature. I provide a means for varying the thickness of this film in response to changes in average temperature of the liquid to maintain the damping force substantially constant.

As is well known, if the average temperature of a liquid such as a silicone rises, its volume increases proportionally with the change in temperature. Further, as the liquid temperature rises, its viscosity or resistance to flow decreases. From these facts it will be evident that if the damping force of the film of liquid of my gyroscope is to be maintained substantially constant it is necessary that the thickness of the film be decreased in response to a rise in the average temperature of the liquid. Conversely, if the temperature of the liquid drops, it is necessary that the thickness of the film be increased. I select the predetermined temperature at which the wall sections 104 occupy their normal positions under the influence of supports 108 and 110 to be the lowest temperature to which the assembly is to be subjected. In this normal position of the wall sections the film thickness is a maximum. I provide the plate 80 with openings 112 through which liquid in the casing 36 may flow into the space surrounding bellows 86. If the average temperature of the liquid within the casing rises, the liquid expands and exerts a force on bellows 86 to contract the bellows to provide space into which the liquid may expand. As the bellows contracts it shifts the cage 100 downwardly as viewed in the drawings. I form each of the wall sections with a number of cams 114 which are normally disposed in slots or recesses 116 formed in the inner surface of casing 36. As the cage 100 moves downwardly in response to an increase in average temperature of the liquid in the manner described, the lower edge of each of the recesses 116 as viewed in the drawings acts on its associated cam 114 to move the corresponding wall section 104 radially inwardly against the action of its resilient supports 108 and 110. This action effectively decreases the diameter of the cage to decrease the thickness of the film of liquid between housing 18 and the inner surface of the cage 100.

As has been explained hereinabove, as the average temperature of the liquid rises, the viscosity decreases and the damping force normally would decrease. I compensate for this decrease in viscosity by decreasing the film thickness to maintain the damping force substantially constant. When the liquid average temperature drops from the value to which it was raised, the liquid contracts to permit the bellows to expand to shift the cage 100 back to its normal position. As the cage returns to its normal position, the resilient connectors 108 and 110 move the wall sections 104 back to their normal positions to return the liquid to the thickness from which it was reduced.

In operation of my improved buoyed gyroscope, cage 104 normally occupies a position in which the cams 114 are disposed in recesses 116 and sections 104 are in the positions to which they are normally urged by supports 108 and 110. This is the condition of my gyroscope corresponding to the lowest temperature to which the assembly is to be subjected. When the average temperature of the liquid rises, the liquid expands to contract bellows 86 to shift cage 100 axially downwardly as viewed in the drawings to cause the lower edges of recesses 116 to act on cams 114 to move wall sections 104 radially inwardly to decrease the thickness of the liquid film between housing 18 and the inner surface of cage 100. In this manner I compensate for the reduction in liquid viscosity by decreasing the film thickness to maintain the damping force substantially constant. When the average temperature of the liquid drops, the liquid contracts to permit bellows 86 to expand to move the cage upwardly as viewed in the drawings to return cams 114 to the recesses 116 to permit supports 108 and 110 to return the sections 104 to their normal positions to restore the film to its original thickness.

It will be seen that I have accomplished the objects of my invention. I have provided an improved floated rate gyroscope which maintains the gimbal housing damping force substantially constant. My gyroscope accomplishes this result by use of a simple, mechanical arrangement. My gyroscope does not require the auxiliary electrical equipment required in systems of the prior art. My gyroscope has a means for compensating for changes in liquid viscosity which is simple in construction and certain and reliable in operation.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A buoyed gyroscope including in combination a gyroscope housing, a casing, fluid disposed in said casing for buoyantly supporting said housing, means defining an axis of rotation for said housing, actuatable means for delimiting a film of said fluid in contact with said housing to provide a predetermined damping force against rotation of said housing around said axis and means responsive to a change in volume of said fluid for actuating said film delimiting means to vary the thickness of said film substantially to maintain the damping force constant.

2. A buoyed gyroscope including in combination a gyroscope housing, a casing, fluid disposed in said casing for buoyantly supporting said housing within said casing, means defining an axis of rotation for said housing, a movable member disposed between said housing and said casing for delimiting a film of fluid between said housing and said member, means for supporting said member in said casing for movements longitudinal of and transverse of said casing, means responsive to a change in volume of said fluid for moving said member longitudinally of said casing and means responsive to said longitudinal movement of said member for moving said member transversely to vary the thickness of said film.

3. A buoyed gyroscope including in combination a gyroscope housing, a casing, fluid disposed in said casing for buoyantly supporting said housing within said casing, means defining an axis of rotation for said housing, a plurality of movable members disposed between said housing and said casing for delimiting a film of said fluid between said housing and said members, means for supporting said members in said casing for movements longitudinal of and transverse of said casing, means responsive to a change in volume of said fluid for moving said members longitudinally of said casing and means responsive to said longitudinal movement of said members for moving said members transversely to vary the thickness of said film.

4. A buoyed gyroscope including in combination a gyroscope housing, a casing, fluid disposed in said casing for buoyantly supporting said housing within said casing, means defining an axis of rotation for said housing, a cage having a plurality of wall sections and means for resiliently supporting said sections on said cage, said cage being disposed between said housing and said casing for delimiting a film of said fluid between said housing and said wall sections, means for supporting said cage in said casing for movement longitudinally of said casing, means responsive to a change in volume of said fluid for moving said cage longitudinally of said casing and means responsive to said longitudinal movement of said cage for moving said wall sections transversely of said casing against the action of said resilient support means to vary the thickness of said film.

5. A buoyed gyroscope as in claim 4 in which said means for moving said wall sections comprises interengageable means carried by said wall sections and by said casing.

6. A buoyed gyroscope as in claim 4 in which said cage supporting means comprises a bellows.

7. An instrument including in combination a movable element, a casing, fluid disposed in said casing for buoyantly supporting said element in said casing, means mounting said element for movement in said casing, actuatable means for delimiting a film of said fluid in contact with said element to provide a predetermined damping force against movement of said element and means responsive to a change in volume of said fluid for actuating said film delimiting means to vary the [thickness] *volume* of said film substantially to maintain the damping force constant.

8. An instrument including in combination a movable element, a casing, fluid disposed in said casing for buoyantly supporting said element in said casing, means mounting said element for movement in said casing, a movable member disposed between said element and said casing for delimiting a film of fluid between said element and said member, means for supporting said member in said casing for movement longitudinal of and transverse of said casing, means responsive to a change in volume of said fluid for moving said member longitudinally of said casing and means responsive to said longitudinal movement of said member for moving said member transversely to vary the thickness of said film.

References Cited in the file of this patent or the original patent

| | | |
|---|---|---|
| 2,213,165 | Kurzina | Aug. 27, 1940 |
| 2,650,502 | Lundberg | Sept. 1, 1953 |
| 2,718,149 | Bamford et al. | Sept. 20, 1955 |